United States Patent [19]

Caulk, Jr.

[11] Patent Number: 5,764,939
[45] Date of Patent: Jun. 9, 1998

[54] RISC PROCESSOR HAVING COPROCESSOR FOR EXECUTING CIRCULAR MASK INSTRUCTION

[75] Inventor: Robert L. Caulk, Jr., Livermore, Calif.

[73] Assignee: LSI Logic Corporation, Milpitas, Calif.

[21] Appl. No.: 540,350

[22] Filed: Oct. 6, 1995

[51] Int. Cl.⁶ .................................................. G06F 9/305
[52] U.S. Cl. ................ 395/381; 395/421.1; 395/800.23; 364/746
[58] Field of Search ............................ 364/746; 395/381, 395/421.1, 421.2, 800.23

[56] References Cited

U.S. PATENT DOCUMENTS

| 5,249,148 | 9/1993 | Catherwood et al. | 364/746 |
| 5,282,275 | 1/1994 | Andr'e et al. | 395/421.1 |
| 5,584,038 | 12/1996 | Papworth et al. | 395/800 |

OTHER PUBLICATIONS

Texas Instruments (TMS32010 User's Guide), pp. 3–7, 1983.
Schneider et al. (Concepts in data structures & software development), pp. 93–96, 1991.

Primary Examiner—Krisna Lim
Assistant Examiner—G. Patel
Attorney, Agent, or Firm—Townsend & Townsend & Crew, LLP

[57] ABSTRACT

An add with circular mask operation is executed in a RISC processor which includes a coprocessor having a register for storing a circular mask value. A circular mask instruction to the coprocessor includes a value in an immediate field and identifies a general register (RS), and a destination register (RT). The coprocessor operates on the value stored in the general register with the value in the immediate field and then masks the results using the circular mask value. The results are then stored in the destination register. The operation includes sign-extending the immediate field before adding to the contents of the general register to provide a sum, and the sum is then masked with the circular mask value.

6 Claims, 2 Drawing Sheets

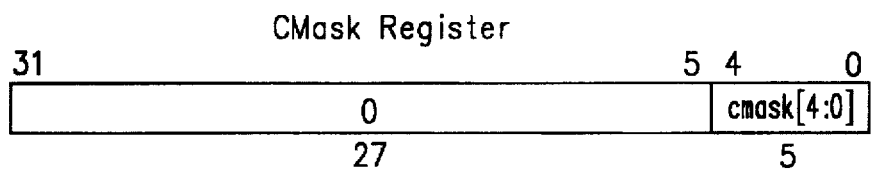
*FIG. 2*
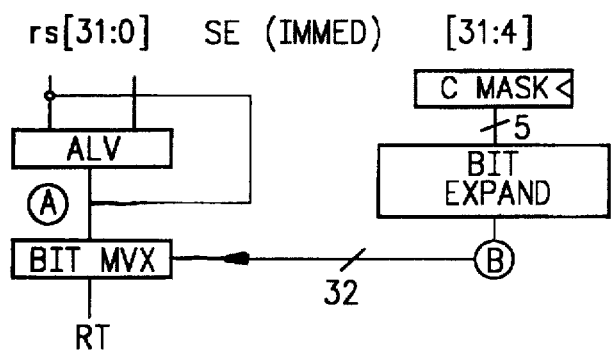
cmask: Circular update mask.
*FIG. 3*
*FIG. 4*

RISC PROCESSOR HAVING COPROCESSOR FOR EXECUTING CIRCULAR MASK INSTRUCTION

BACKGROUND OF THE INVENTION

This invention relates generally to computer systems, and more particularly the invention relates to a computer system having an extended instruction set including a circular mask instruction.

Digital signal processing (DSP) utilizes circular address modification when executing various mathematical operations such as Discrete Fourier Transform (DFT) and circular convolution. The conventional DSP processor utilizes special registers, modified comparitors, and other out-of-order sequence processing hardware in implementing these functions.

Disclosed in copending application Ser. No. 08/540,336, filed Oct. 6, 1995, now U.S. Pat. No. 5,603,047 is a new superscalar RISC processor which executes the MIPS-II instruction set. The RISC offers distinct advantages in reduced hardware complexity and thus reduced design time and needed area in a VLSI chip implementation, a uniform and streamlined handling of instructions, and increase in computing speed. A disadvantage resulting from the limited instruction set is the need for a plurality of instructions in executing some functions.

However, in accordance with the present invention the new processor includes an extended instruction set including a circular mask instruction for circular translation of digital sequences.

SUMMARY OF THE INVENTION

In accordance with the invention, an instruction executed in a RISC processing system is defined by an opcode and includes a register address the contents of which are added to a value embedded in the instruction immediate field and modified according to the circular mask values stored in a circular mask register. The results are stored in a target register defined in the instruction.

In a preferred embodiment, the RISC system includes a first CPU which interfaces with a coprocessor. The coprocessor handles exceptions in a supervisory role and also executes the extended instruction set including the circular mask. A register in the coprocessor stores a 5-bit mask value.

The invention and objects and features thereof will be more readily apparent from the following detailed description and dependent claims when taken with the drawings.

BRIEF DESCRIPTION OF THE DRAWINGS

FIG. 2 is an extended instruction (ADDCIU) in the system of FIG. 1 for the execution of a circular translation in accordance with the invention.

FIG. 3 is a register in the coprocessor of FIG. 1 which stores a mask value for implementing the invention.

FIG. 4 is a logic schematic for the execution of the circular translation instruction (ADDCIU).

DETAILED DESCRIPTION OF THE ILLUSTRATIVE EMBODIMENTS

Figure 1:
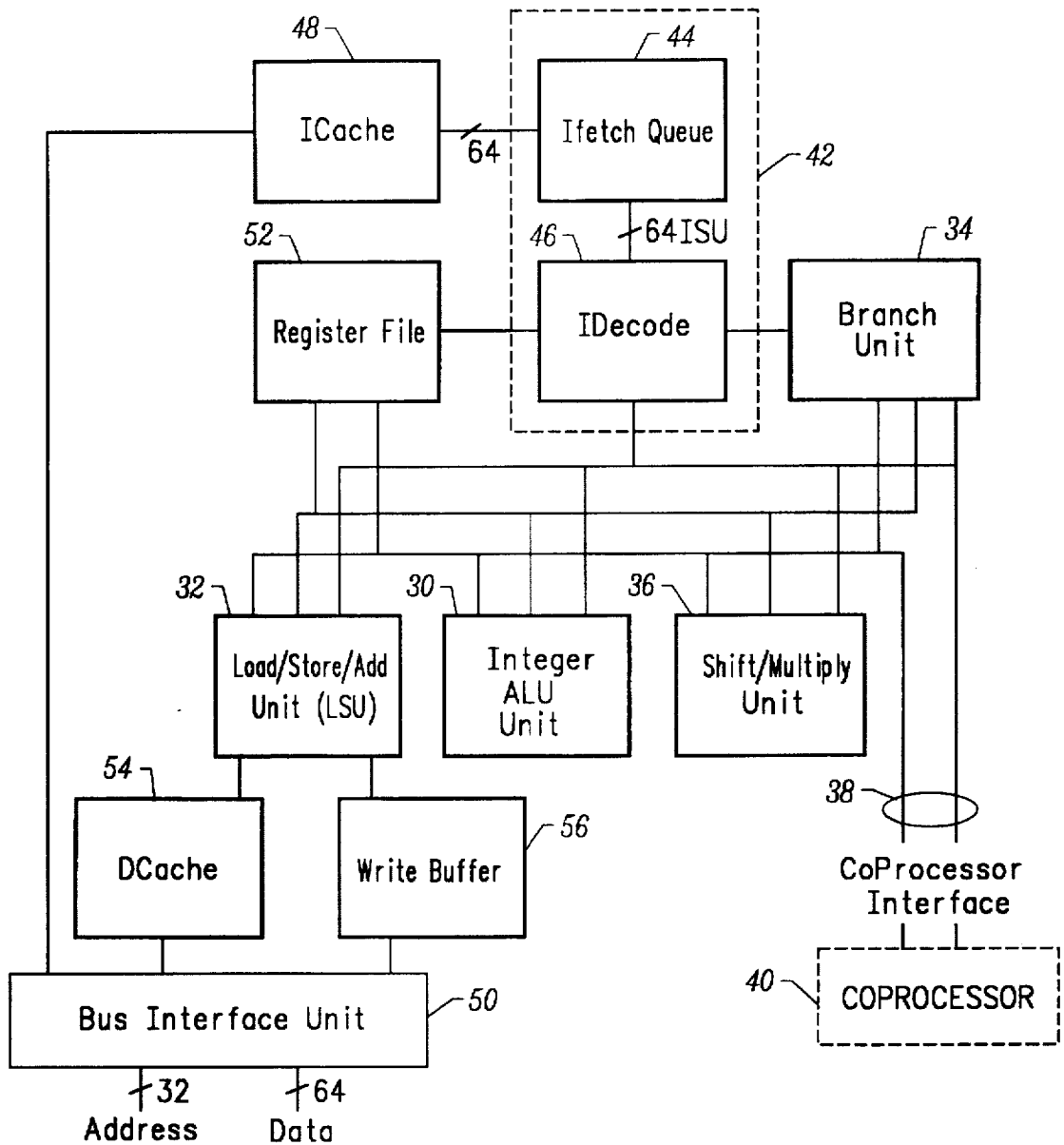
FIG. 1 is a functional block diagram of a RISC system having a coprocessor in which the present invention is implemented in accordance with one embodiment.

FIG. 1 is a functional block diagram of the microprocessor disclosed in copending application U.S. Pat. No. 5,603,047 supra which executes standard MIPS-I and MIPS-II instruction sets along with added instructions. The microprocessor has been implemented using the LSI logic coreware system on a chip methodology whereby the core can be integrated into a system on a chip of various configurations. The machine can issue and retire two instructions per cycle using a combination of five independent execution units: ALU 30, load/store/add unit (LSU) 32 which executes, loads and stores and can also execute, add and load immediate instructions, branch unit 34, multiply/shift unit 36 and coprocessor interface 38 with a coprocessor 40. The instruction scheduling unit (ISU) 42 includes Ifetch queue (Q) unit 44 and Idecode unit 46. An instruction cache 48 is connected between a bus interface unit 50 and queue stage 44. The bus interface unit 50 manages the flow of instructions and data between the core and the system via the SC bus interface. A register file 52 contains the general purpose registers of the core. It supplies source operands to the execution units and handles the storage of results to target registers. A data cache 54 and write buffer 56 are connected between bus interface unit 50 and LSU unit 32.

Ifetch queue 44 optimizes the supply of instructions to the microprocessor even across breaks in the sequential flow of execution (i.e., jumps and branches). Idecode unit 46 decodes instructions from the Ifetch queue, determines the actions required for the instruction execution, and manages the register file 52, LSU 32, ALU 30, and multiply unit 36 accordingly. Branch unit 34 is used when branch and jump instructions are recognized within the instruction stream.

LSU unit 32 manages loads and stores of data values. Loads come from either the decache 54 or the SC bus interface 50 in the event of a decache miss. Stores pass to the data cache and SC bus interface through the right buffer 56. LSU unit 32 also performs a restricted set or arithmetic operations, including the addition of an immediate offset as required in address calculations. The integer ALU unit 30 calculates the result of an arithmetic or a logic operation, while the multiplier/shift unit 36 performs multiply and divide operations. Thus all three units perform logical, arithmetic, and data movement operations.

Coprocessor interface 38 allows the attachment of tightly coupled, special purpose processing units such as coprocessor 40 which enhances the microprocessor's general purpose computational power. Using this approach, high performance applications specific hardware can be made directly accessible to a programmer at the instruction set level. Coprocessor 40 handles exceptions and also executes extended instructions including the add with circular mask (ADDCIU) instruction in accordance with the invention.

FIG. 2 illustrates the add with circular mask immediate (ADDCIU) instruction in accordance with the illustrative embodiment. The immediate field of the instruction (bits 15:0) is sign-extended and added to the contents of general register RS (bits 25:21) the result of which is masked with the expanded value in a special register CMASK according to the following equation:

$$T: \text{sign\_extend\_immed} = (\text{immediate}_{15})^{16} \| \text{immediate}_{15..0} \text{GPR}[rt] = \text{GPR}[rs]_{31..cmask} \| (\text{GPR}[rs] + \text{sign\_extend\_immed})_{cmask...0}$$

FIG. 3 illustrates the circular mask (cmask) register of coprocessor 40. This register is utilized in executing the ADDCIU instruction as noted above. The ADDCIU instruction is used after a load or store instruction to update the base address register with the addition of base plus offset, modified according to the 5-bit value in the cmask register. This feature is particularly important in DSP and other applications that use circular buffers. The instruction allows the base address modification, to occur as a modulo add operation with the modulus value in the cmask register. Thus a circular buffer address scheme can be executed with a fewer number of instructions than the normal RISC processor, as long as the circular buffer size is a power of 2.

The use of the ADDCIU is not limited to circular buffers or address calculations, but can be used to save instruction count wherever a modulo add or similar operation is required. Even though this register resides in the coprocessor, user mode access will always be granted.

FIG. 4 is a logic schematic for the execution of the add with circular mask immediate instruction. The data in register RS is added with the sign-extended immediate in adder 60 with the 32 bit output applied to bit mask 62. Bit mask operates on the summed value using the 5-bit cmask in the cmask register of FIG. 3. The output is then stored in destination register RT.

The ALU is used to perform a normal addition and provides the result (A).

The CMASK register value is expanded from its 5 bit value to the 32 bit value B as follows: The number of 1 values in (B) is equal to the value in cmask. In other words, $B=2^{cmask}-1$. Each bit of B is then used to select the corresponding bit form (A) or rs in the BIT MUX block. This is just 32, 2 to 1 multiplexors or the equivalent. In other words, for each bit $X=\phi \ldots 31$: If B[x] is 1, then rt[x]=A[x] else rt[x]=rs[x]

There has been described a circular mask instruction implementable in a RISC processor which expedites circular translation or shifting of numbers as used in digital signal processing. While the invention has been described with preference to a specific embodiment, the description is illustrative of the invention and is not to be construed as limiting the invention.

Various modifications and applications may occur to those skilled in the art without departing from the true spirit and scope of the invention as defined by the appended claims.

What is claimed is:

1. A method of executing a circular mask operation in a RISC processor system including a coprocessor comprising the steps of:

a) providing a register in said coprocessor for storing a circular mask value, b) providing a circular mask instruction in which a value in an immediate field of said instruction, a general register (RS), and a destination register (RT) are identified, c) employing the coprocessor for operating on a value in said general register with said value in said immediate field and masking results of the operation using said circular mask value, and d) storing the masked results in said destination register.

2. The method as defined by claim 1 wherein said immediate field is sign-extended and added to the content of such general register to provide a sum.

3. The method as defined by claim 2 wherein said sum is masked with the expanded value from said register storing a circular mask value.

4. A superscalar coprocessor for executing a circular mask operation comprising:

a) a coprocessor including a register for storing a circular mask value, b) a general register (RS), c) a destination register (RT), d) an instruction for said coprocessor in which a value in an immediate field of said instruction, said general register and said destination register are identified, said processor operating on a value in said general register with said value in said immediate field and masking results of the operation using said circular mask value, and then storing the masked result in said destination register.

5. The superscalar processor as defined by claim 4 wherein said processor provides a sum of said immediate field sign-extended and the contents of said general register.

6. The superscalar processor as defined by claim 5 wherein said sum is masked with the expanded value from said register storing a circular mask value.

* * * * *